United States Patent [19]

Ou

[11] Patent Number: 5,113,333

[45] Date of Patent: May 12, 1992

[54] MAGNETIC DC-TO-DC CONVERTER

[75] Inventor: Niann-Gwo L. Ou, Daly City, Calif.

[73] Assignee: Intech, Inc., Santa Clara, Calif.

[21] Appl. No.: 462,100

[22] Filed: Jan. 8, 1990

[51] Int. Cl.[5] ............................................ H02M 3/337
[52] U.S. Cl. ...................................... 363/25; 363/133; 323/266
[58] Field of Search ...................... 363/19, 21, 23, 25, 363/26, 133; 323/265, 266; 307/141, 590, 597, 601, 603, 352, 353

[56] References Cited

FOREIGN PATENT DOCUMENTS

1499425  8/1989  U.S.S.R. .

Primary Examiner—Steven L. Stephan
Assistant Examiner—Emanuel Todd Voeltz
Attorney, Agent, or Firm—Law Offices of Thomas E. Schatzel

[57] ABSTRACT

Magnetic direct current to direct current converter with the input isolated from the output. A pulse generator from the feedback is incorporated in the feedback circuitry to regulate the output relative to the input.

18 Claims, 4 Drawing Sheets

Fig_1

Fig.-2

Fig_3

MAGNETIC DC-TO-DC CONVERTER

BACKGROUND OF THE INVENTION

1. Field of the Invention

The present invention relates to power supplies and more particularly to a magnetic direct current to direct current converter having magnetic coupling feedback.

2. Description of the Prior Art

Converters typically switch an unidirectional source of current at a high frequency through transformer windings. An output winding of the transformer provides an alternating current which may be rectified to produce a d.c. source of power. A forward converter may include a switch which switches current through a transformer winding. An output winding provides the alternating current in response alternatively to build-up and collapse of flux of the transformer.

There are many electrical power applications with dc-to-dc converters requiring power to be supplied at a particular voltage or current level. Many power supplies convert the input power to output power at the desired current or voltage level. However, frequently, the input power is unregulated such that the output current or voltage varies. Also, the load conditions on the power supply may vary which in turn impacts the output current and/or voltage. Furthermore, the temperature at which the circuit is operating impacts the output current and/or voltage.

To maintain the power supply at a predetermined level, many power supplies have a regulator which monitors the output and modifies the input as necessary. Also, many applications require isolation of the output from the input. For example, it may be necessary to isolate the output side from noise existing on the input side. In switch-mode power supplies having a transformer, the input circuit is frequently electrically isolated from the output circuit, with a transistor switch in the input circuit tied to the primary coil and which is controlled by a feedback signal from the secondary coil. Electrical isolation between the primary and secondary coils may also be maintained by an opto-isolator which transmits the feedback information from the secondary coil side to the primary coil side. However, the linearity of opto-isolators commonly varies with temperature, with a dramatic decrease in gain at high temperature (above 85° C.) and a permanent decrease over time. Also, the performance of opto-isolators is subject to radiation. The gain varies as a function of such radiation. Consequently, opto-isolators are generally precluded from military and satellite applications or other applications where the temperature varies significantly; long life is desired; and/or there are significant variations in radiation.

Magnetic isolation is a further form of isolation and uses a transformer or inductor sampling method of feedback. The benefits are relatively constant performance notwithstanding temperature and time variations. The disadvantages include complexity, low performance due to signal averaging, errors and noise feedback mixing with the desired signal.

The prior art includes U.S. Pat. No. 4,683,528, issued to Snow, et al. relating to a pulse position modulated regulation for power supplies. The circuitry includes a pulse transformer to transmit pulses from the secondary coil side of the transformer to the primary coil side with the power through the primary coil being controlled by varying the duty cycle of the drive signal for a transistor switch. U.S. Pat. No. 4,357,654, issued to Ikenoue, et al. discloses an inductively coupled dc-to-dc converter. The circuitry includes an inductance for storing energy when a switching transistor is turned on and releasing the stored energy when the switching transistor is turned off, and a semiconductor active element used as a flywheel element to provide the path for current resulting from the stored energy. U.S. Pat. No. 4,355,353, issued to Michael Farrer discloses a power supply apparatus having a transformer reset sensing circuit to inhibit reset of a switching transistor in the primary side of a transformer until resetting of the transformer.

SUMMARY OF THE PRESENT INVENTION

It is an object of the present invention to provide a magnetic feedback with magnetic isolation and of which the feedback circuitry is accurate and relatively uncomplicated in design.

It is a further object of the present invention to provide a magnetic feedback in which the output is highly regulated relative to the input.

It is a further object of the present invention to provide a magnetic feedback circuit of which the performance is relatively insensitive to ambient temperature.

It is a further object of the present invention to provide a magnetic feedback circuit which is relatively insensitive to time of use.

It is a further object of the present invention to provide a magnetic feedback circuit which is relatively insensitive to radiation.

An exemplary embodiment of the present invention includes a magnetic feedback implemented in a dc-to-dc converter with a feedback coupled inductor connected to the load-side of a power transformer and with a diode to detect the feedback voltage during "flyback" of the power transformer. The magnitude of the feedback is determined by the turns ratio and does not react to changes in temperature, age or radiation. A sampling switch circuit is in series with the diode to smooth and recover the feedback signal. The sampling switch is regulated by a sampling pulse. The timing of the sampling pulse is delayed and the width may be set to eliminate the switching energy and noise components to increase the load range.

An advantage of the magnetic feedback of the present invention is that it is of relatively uncomplicated design.

Another advantage of the magnetic feedback of the present invention is that the output is highly regulated relative to the input.

Another advantage of the magnetic feedback of the present invention is that it has a long life.

Another advantage of the magnetic feedback of the present invention is that it is operable over a wide temperature range.

These and other objects and advantages of the present invention will no doubt become obvious to those of ordinary skill in the art after having read the following detailed description of the preferred embodiment which are illustrated in the various drawing figures.

DETAILED DESCRIPTION OF THE PREFERRED EMBODIMENT

Figure 1:
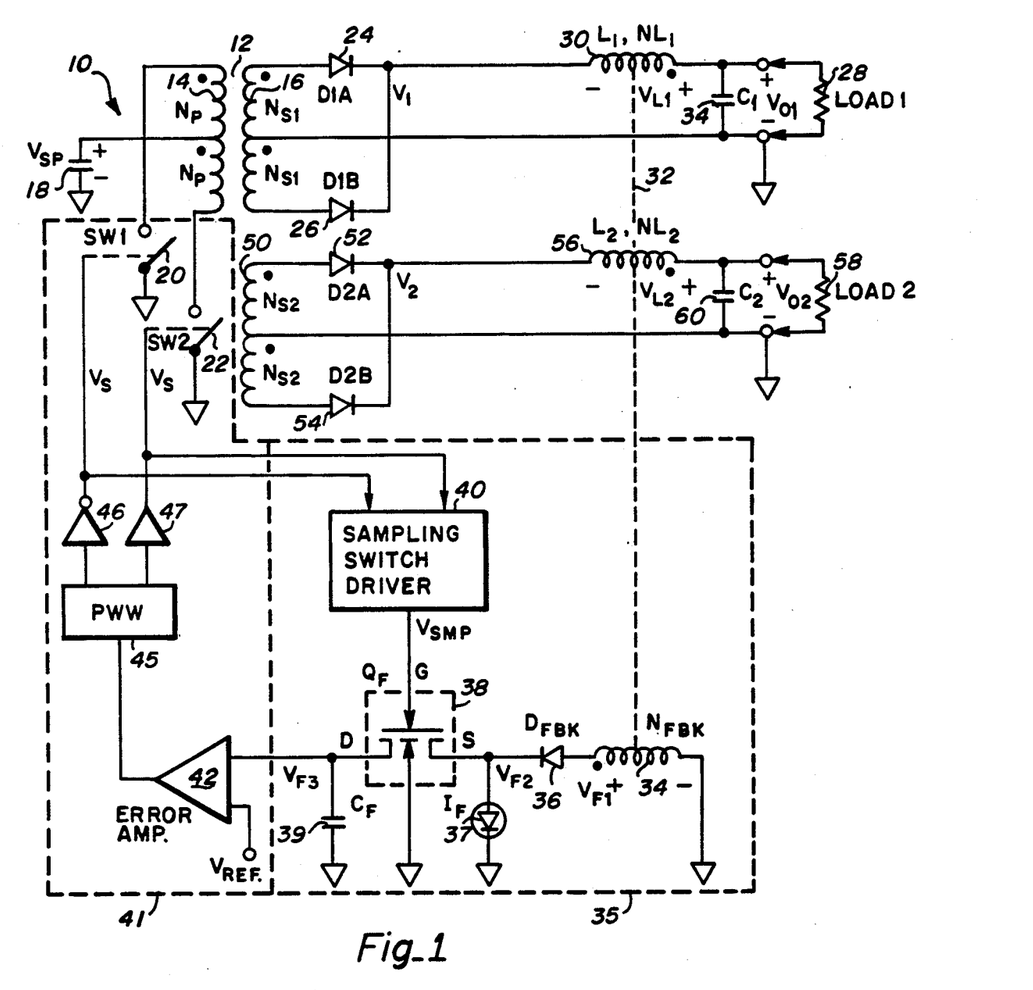
FIG. 1 is a schematic diagram of a feedback circuit of the present invention implemented in a dc-to-dc converter.

FIG. 1 is a schematic diagram of a magnetic feedback circuit of the present invention implemented in a dc-to-dc converter and referred to by the general reference character 10. The converter includes a transformer 12 having a primary winding 14 and a secondary winding 16. The primary winding 14 has a center tap connected to a direct current supply source 18 ($V_{sp}$) which is also joined to the ground reference of the primary side of transformer 12. The supply source 18 may be of various forms and may vary from a very low voltage to a very large voltage source. Such applications may include a battery, a generator on an aircraft, etc. One side of the primary winding 14 is joined to an electronic switch 20 which also extends to ground and the other side of winding 14 is joined to an electronic switch 22 which extends to ground. The switches 20 and 22 may be in the form of pulse transistors such as power MOSFETS or bipolar transistors. The secondary winding 16 of the transformer 12 has one end tied to a diode 24 and the other end tied to a diode 26 of which the cathodes are tied in common at a junction 27. The center tap of the winding 16 extends to the load 28. In series with the diode 24 and the load 28 is a filter including an output filter inductor 30 wound on a core 32 and a filter capacitor 34 extending across the load 28. One side of the load 28, capacitor 34 and the center tap of winding 16 are tied to ground reference on the load side of transformer 12.

A feedback circuit network 35 is incorporated to sense the output voltage of the converter 10 and transfer it back to the primary side of the transformer 12. The network 35 includes a winding 34 which is magnetically coupled to the winding 30 on the same common core 32. The winding 34 is grounded to the ground of the primary side of the transformer 12. In series with the winding 34 is a diode 36, the cathode of which is tied to a current regulating diode 37 which extends to the primary side ground. The cathode of the diode 36 is also tied to a sampling switch 38 which has one terminal extending to a capacitor 39 which is grounded to the primary side ground. The sampling switch 38 may take the form of a MOSFET switch with the gate tied to a sampling switch driver 40.

The sampling switch 38 and sampling switch driver 40 are also tied to a primary control circuit 41. The circuit 41 includes an error amplifier 42 with one terminal tied to switch 38, another input terminal tied to a reference potential $V_{Ref}$, and an output terminal extending to a pulse width modulator 45. The output of the modulator 45 is joined to a pair of inverters 46 and 47. Inverter 46 is joined to switch 20 and to sampling switch driver 40. Inverter 47 is joined to switch 22 and to sampling switch driver 40.

The converter 10 may include a plurality of loads. For illustrative purposes, the circuit of FIG. 1 is shown with two loads. For the second load, there is a secondary winding 50 having a center tap and with opposite ends tied to a diode 52 and 54, respectively. The cathodes of the diodes 52 and 54 are joined in common to a filter inductor 56 which is wound on the core 32. This inductor 56 is tied in series with a load 58 which is also tied to the load-side return and in parallel with a capacitor 60.

Figure 2:
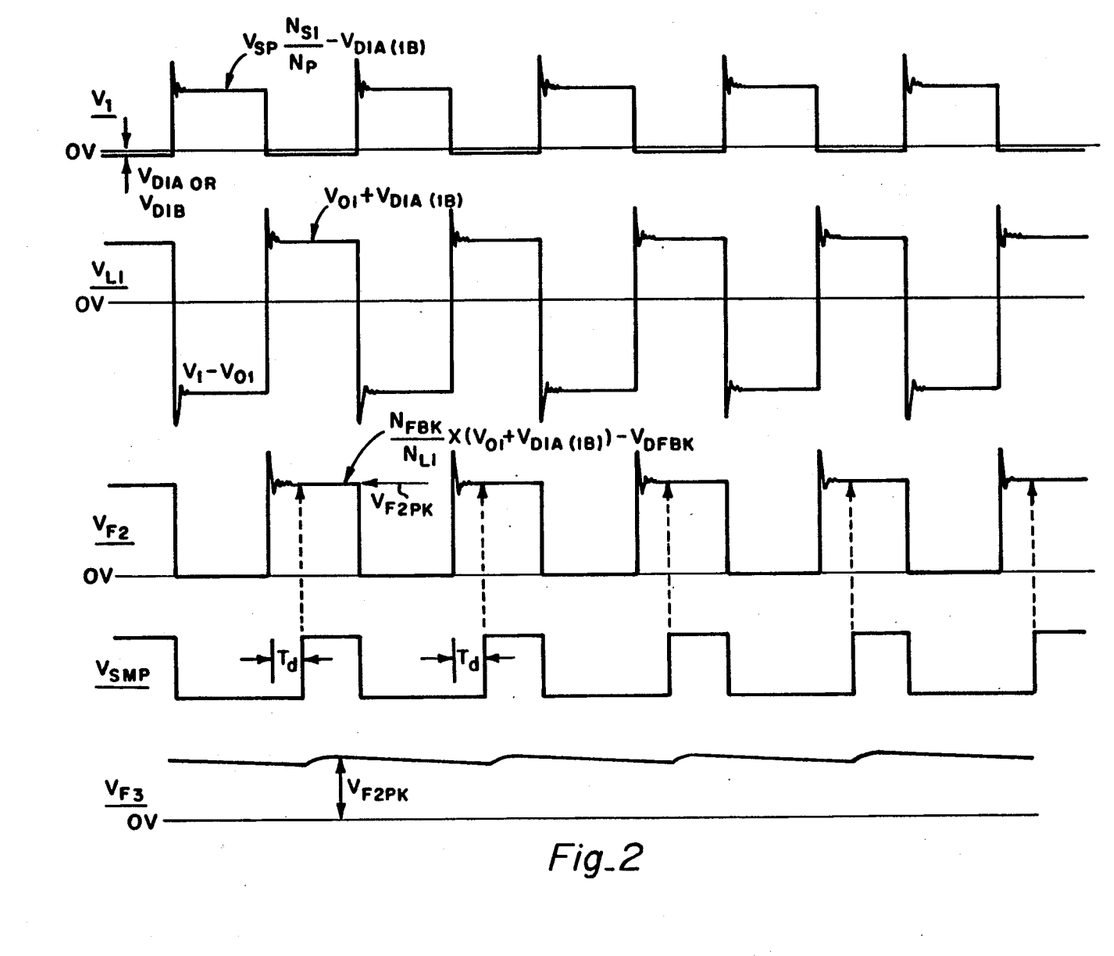
FIG. 2 is a timing diagram of signals illustrating operation of the embodiment of FIG. 1 under moderate load conditions.

In operation, and referring to FIGS. 1 and 2, the dc supply source 18 provides a voltage $V_{sp}$ which is applied to the transformer 12 at the centerpoint primary winding 14. The number of windings on the primary 14 to the center tap are represented as $N_p$. The switches 20 and 22 of the primary control circuit 41 create open and close operations of the primary winding circuit responsive to signals at the gates of the switches 20 and 22. Accordingly, the magnetic flux in the coil 14 decreases and increases responsive to the pulses $V_s$ controlling the switches 20 and 22 so as to create a magnetic coupling to the secondary windings on the transformer 12. Viewing the secondary winding 16, the number of windings on the secondary 16 to the center tap are represented as $N_{s1}$. The diodes 24 and 26 on the secondary windings 16 limit the current flow to be unidirectional so as to provide pulses. The voltage $V_1$ at the junction 27 is a function of the turns ratio and the voltage drop across the diodes 24 and 26. The current flow to the filter through the output inductor winding 30 creates magnetic flux in the winding 30 and a voltage $V_{L1}$ across said winding. The magnetic flux is in turn magnetically coupled to the feedback winding 34. The number of windings on the inductors 30 and 34 are represented as $N_{L1}$ and $N_{FBK}$, respectively. The relative polarity of the windings 30 and the winding 34 are opposite. A voltage $V_{F2}$ is then provided across the input to one terminal of the switch 38 and the primary ground reference. The magnitude of $V_{F2}$ is a function of the potential across the winding 34 and the drop across the diode 36. The diode 36 detects the voltage on the feedback winding 34 during the time of flyback. The voltage drop developed across the diode 36 is referred to as $V_{DFBK}$. As illustrated, the signal $V_{F2}$ includes decaying perturbations at the leading edge and then flattens. This results in "noise" at the edges of the signals. Thus, it is desired to preclude such "noise" from feedback to the primary control circuit 41. Accordingly, the gate 38 is controlled to remain open during the noise by delaying the output sampling signal $V_{SMP}$ of the switch driver 40 to the gate of switch 38 by a time period $T_d$ as shown in FIG. 2. Then, with the gate 38 closed, the signal "$V_{F3}$" across the capacitor 39 is provided to one terminal of the error amplifier 42 which compares it to the reference potential $V_{Ref}$. The output of said error amplifier 42 is then fed to the pulse width modulator 45, i.e., including a sawtooth generator and comparator. The pulse width modulator 45, then provides pulses of the correct pulse width through the inverters 46 and 47 to the switches 20 and 22 and to the driver 40 to close the loop. Accordingly, the switches 20 and 22 are closed in response to the feedback signals. The switches 20 and 22 are connected in push-pull such that when one is closed, the other is open. Also, the sampling switch driver 40 provides the delayed pulse signal "$V_{SMP}$" to the gate of the sampling switch 40 in response to the feedback.

As shown by FIG. 2, for loads 28 wherein the output current $I_o$ equals or exceeds fifty percent of the ripple current of the inductor 30, the gate to the sampling switch 38 is not closed during the time period $T_d$ so as to avoid passing the leading edge perturbations of the $V_{F2}$ potential to the primary control circuit 41. By incorporating the delay $T_d$, the perturbations are dissipated by the time that the gate 38 is closed such that the potential $V_{F3}$ is relatively flat. This tends to prevent spikes and discontinuities contained in the feedback signal $V_{F2}$ from appearing at the error amplifier input, $V_{F3}$ thereby providing a highly regulated dc output.

Figure 3:
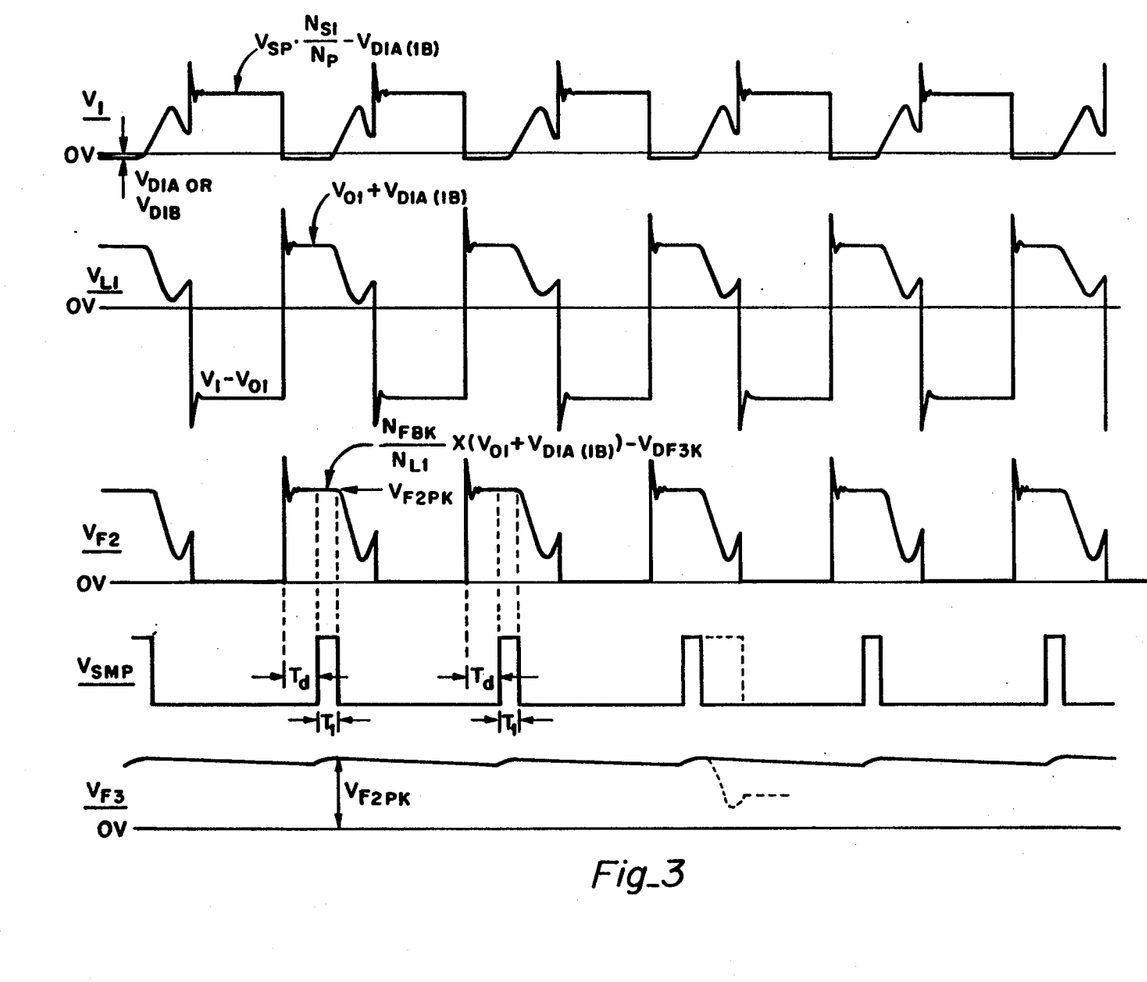
FIG. 3 is a timing diagram of signals illustrating operation of the embodiment of FIG. 1 under very light load conditions.

In the situation wherein the application requires a very light load, e.g., output load current $I_o$ is less than fifty percent of the inductor ripple current of the inductor 30, the signal waveforms become as illustrated in FIG. 3. As illustrated, the trailing edge on the second half of the $V_1$ potential tends to build up at an irregular rate thereby adding further perturbations into the half-wave signals $V_{F2}$. Thus, the half-wave signal $V_{F2}$, has perturbations at both its leading and trailing edges. Accordingly, to avoid the perturbations at both edges, the sampling switch driver 40 is such that it delays conduction by the time period "$T_d$" and then only conducts for a period "$T_1$" so as to avoid the perturbations at both ends of the "$V_{F2}$" signal. Consequently, the potential "$V_{F3}$" is relatively flat.

To illustrate the effects of the conduction period of the sampling switch 38, if the driver 40 is not controlled and merely delayed under the very light load conditions, the waveforms $V_{SMP}$ and $V_{F3}$ in FIG. 3 include in broken lines (for one cycle) of the wave shapes. As illustrated, the potential $V_{F3}$ would have a significant decrease during the trailing edge perturbations. Thus, for very light loads, without a fixed sampling time, regulation would be sacrificed.

Though the discussion has concentrated merely on one load, namely load 28, the same analysis applies for each load for applications with multiple loads.

Accordingly, as is illustrated by the network of FIG. 1, the primary side of the dc-to-dc magnetic converter is isolated from the secondary side and the feedback winding is grounded on the primary side ground. Also, by utilizing the sampling switch driver 40 to drive the sampling switch 38 with a delayed gate signal pulse, with moderate or large loads, tends to eliminate the spikes which are present at the leading edge of the feedback signal. Furthermore, by controlling both the delay and the width of the gate signal "$V_{SMP}$", and thus the time frame during which the sampling switch 38 is closed, during the half-wave feedback signal "$V_{F2}$" perturbations at each end are elminated from affecting the regulation of the converter output. The end result is an output dc voltage $V_o$ which is highly regulated and which remains stable. Also, the transfer characteristics are primarily determined by the turns ratio of the filter inductor 30 and the feedback inductor 34. Such ratio is insensitive to temperature, time and radiation. Most applications deem a load regulation of plus or minus two percent for load variations. With the time delay of the pulse $V_{SMP}$ such regulation is realized with a five to one load current variation. With the delayed fixed-time pulse $V_{SMP}$, such regulation is realized with a ten to one load current variation.

The voltage regulation is also a function of (a) the resistance of the winding of the filter inductor 30; and (b) the voltage drop across the diodes 24, 26 and 36. These can be overcome by using larger wires to reduce the resistance in the windings and by selecting diodes having smaller voltage variations for the desired current range.

With the present invention the temperature coefficients of the output voltages are determined by; (1) the difference between the temperature coefficients of the diodes; and (2) winding resistance. To illustrate, using the load 28 for illustrative purposes:

$$V_{L1} = V_{01} + VD + I_o R_s \quad (1)$$

where,
$V_D = V_{D1A} = V_{D1B}$;
$R_S$ = winding resistance of coil 30; and
$I_o$ = output current.

$$V_{F1} = \left(\frac{N_{FBK}}{N_{L1}}\right)(V_{L1}) \quad (2)$$

where N is number of turns on winding.
Therefore, $$V_{F1} = K(V_{01} + V_D + I_0 R_S) \quad (3)$$

where $K$ is a constant of $\frac{N_{FBK}}{N_{L1}}$.

$$V_{F2} = V_{F1} - V_{DFBK} \quad (4)$$
$$= KV_{01} + K V_D - V_{DFBK} + KI_0 R_S. \quad (5)$$

Thus, by selecting the appropriate terms ratio and the current density of the diode 36 (set by $I_F$), the temperature coefficient can be made virtually zero. Even if the temperature coefficient is not eliminated, it is well-defined as shown in equation (5) and if necessary, it can be further compensated by introducing a temperature compensated correction factor to offset it.

With the turns ratio of the secondary winding to the filter inductor winding the same for all sections, $$\frac{N_{S1}}{N_{L1}} = \frac{N_{S2}}{N_{L2}}$$

the dynamic cross regulation, i.e., the variations in the loads across the various sections, is very good. This is due to the fact that the feedback is taken from the unified and normalized output voltage. Also, the delayed sampling switch 38 not only eliminates the switching spikes, but also with $I_F$, provides for a very fast discharge path. This improves the transient response of the converter 10.

Figure 4:
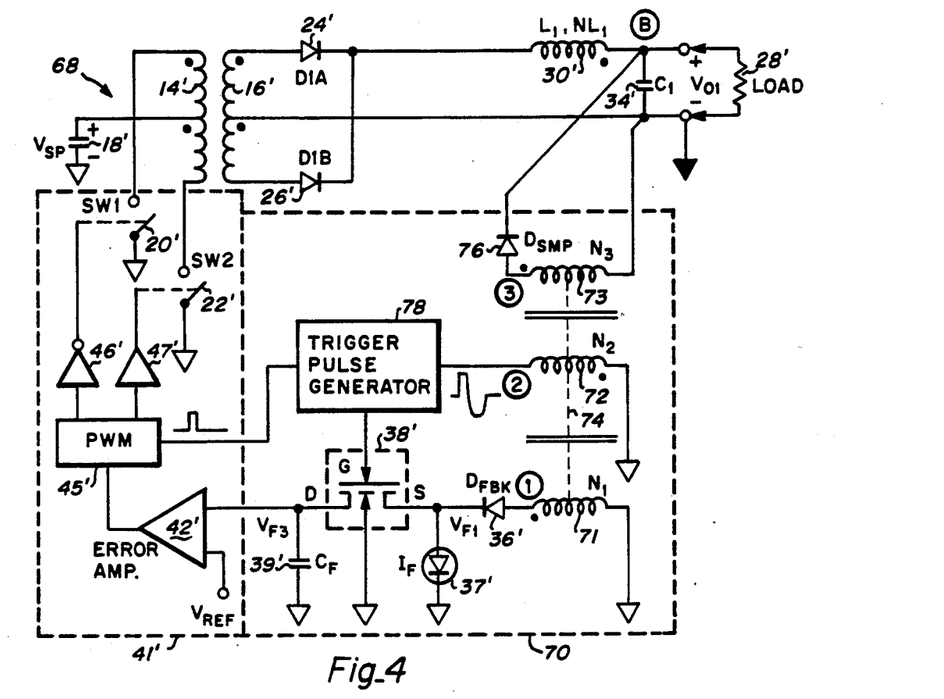
FIG. 4 is a schematic diagram of an alternative embodiment of the present invention.

FIG. 4 illustrates an alternative embodiment of the present invention and referred to the general reference character 68. Those components similar to components of FIG. 1 carry the same reference numeral distinguished by a prime designation. In FIG. 4, the converter 68 includes a magnetic pulse feedback circuit 70. The circuit 70 includes a transformer with three coupled windings 71, 72 and 73 wound on a gapped core 74. The winding 73, with turns $N_3$, has one end joined to the secondary ground reference and the other end tied in series with a diode 76 extending to the load 28'. The winding 72, with turns $N_2$, is tied to the primary ground and to a trigger pulse generator 78 which extends to the pulse width modulator 45'. The winding 71, with turns $N_1$, extends from the primary ground reference to the diode 36'.

Figure 5:
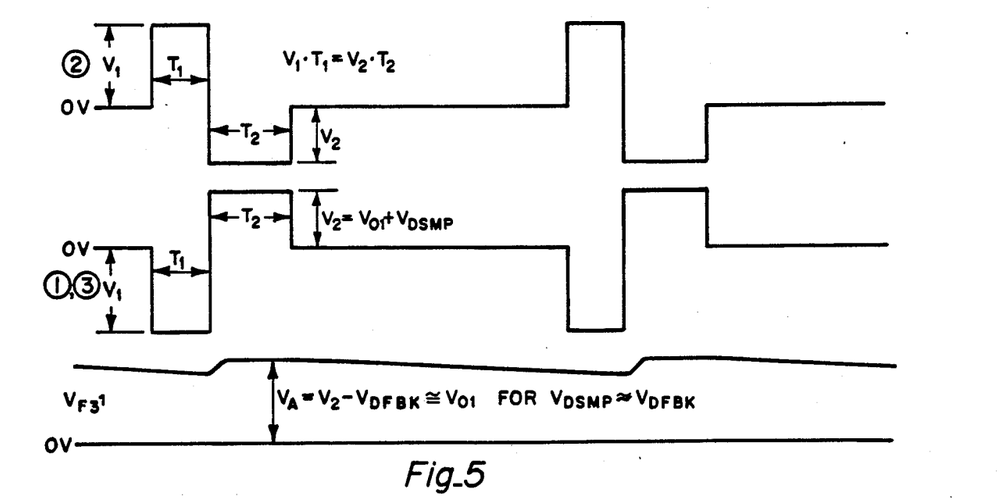
FIG. 5 is a timing diagram of signals illustrating operation of the embodiment of FIG. 4.

Assuming the turns ratio $N_1:N_2:N_3 = 1:1:1$, then the timing diagram of FIG. 5 illustrates the waveforms (2) of the signal of winding 72, the waveform (1) of the signal winding 71, and $V_{F3'}$.

The voltage (2) across the winding 72 equals that across winding 73 such that $$V_2 = V_{01} + V_{DSMP} \tag{6}$$

where $V_{DSMP}$ is the voltage drop across the diode 76. Also, the voltage (1) across the winding 71 equals in magnitude that across the winding 72 such that, $$V_2 = V_{F2} + V_{DFBK} \tag{7}$$

Therefore, $$V_{F3'} = V_2 - V_{DFBK}; \tag{7}$$

or $$V_{F3'} = V_{01} + V_{DSMP} - V_{DFBK}; \tag{8}$$

and $$V_{F3'} = V_{01} \text{ where } V_{DSMP} \text{ equals } V_{DFBK}.$$

The temperature coefficient of the output voltage can be made very small by tightly thermally coupling the diodes 76 and 36', e.g., placed on the same hybrid substrate and using the same type of diode for both. Also, since a gapped core can be used, the characteristics, e.g., winding inductance, interwinding capacitance, Q, etc., of circuit 70 are well defined. Thus, their values can be well controlled which in turn limits temperature variations.

Continuous monitoring of the output voltage $V_{01}$ is available because the feedback signal is always present. This is true even if the output is in the fault conditions, e.g., short circuited, overloaded, etc. Also, the transmitting of the feedback signal is fully synchronized with the system clock. This eliminates the possibility of generating an unstable duty cycle which in turn could generate random (or beat frequency) voltage ripple at the output. As can be seen, the feedback circuit 70 only includes one active device, i.e., the diode 76. This allows the entire converter to be included on a single integrated circuit. Also, the transformer on the core 74 can be very small since it merely carries a signal and does not carry any load current or high voltages. Thus, the circuit 70 does not carry any significant quantity of power.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A direct current to direct current converter comprising, in combination:
   a power transformer with a primary winding and a secondary winding, said primary winding having a first connection means for receiving a direct current supply source and a second connection means for connection to a first ground reference, and said secondary winding being connected to a second ground reference;
   a primary control circuit including a switching means connected to said primary winding for controlling the duty cycle of power delivered to said primary winding from said source, and a comparator means for receiving and comparing a reference signal and a feedback signal and generating an error signal relative to a comparison and in turn generating responsive control signals to said switching means; and
   a feedback network including a first inductive means connected to sense a electrical load connected to said secondary winding, a feedback inductor magnetically coupled to said first inductive means, said first inductive means connected in series with a first unidirectional conductive valve and a second unidirectional conductive valve, said first and second unidirectional conductive valves being connected to opposing ends of said secondary winding, said feedback inductor connected in series with a third unidirectional conductive valve, a sampling switch connected to said third unidirectional conductive gate and to said comparator means to control current flow intermediate said third unidirectional conductive gate and said comparator means, said sampling switch including a control gate for controlling conduction through said sampling switch, and gate control means connected to said gate and to the primary control circuit to control said sampling switch responsive to the status of said error signal.

2. The converter of claim 1 wherein,
said first inductive means and said feedback inductor are windings on a common core in transformer relationship, the turns ratio of said first inductive means and feedback inductor being one.

3. The converter of claim 1 wherein
said first and second unidirectional conductive valves are diodes of which the matching electrical characteristics are equal.

4. A direct current to direct current converter comprising, in combination:
   a power transformer with a primary winding and a secondary winding, said primary winding having a first connection means for receiving a direct current supply source and a second connection means for connection to a first ground reference, and said secondary winding being connected to a second ground reference;
   a primary control circuit including a switching means connected to said primary winding for controlling the duty cycle of power delivered to said primary winding from said source, and a comparator means for receiving a reference signal and a feedback signal and generating an error signal relative to the comparison and in turn generating responsive control signals to said switching means; and
   a feedback network to sense an electrical load connected to said secondary winding, the feedback network including a first inductive means and a feedback inductor magnetically coupled to said first inductive means, said first inductive means connected in series with a first unidirectional conductive valve and a second unidirectional conductive valve, said first and second unidirectional valves being connected to opposing ends of said secondary winding, said feedback inductor connected in series with a third unidirectional conductive valve, a sampling switch connected to said third unidirectional conductive gate and to said comparator means to control current flow intermediate said third unidirectional conductive gate and said comparator means, said sampling switch including a control gate for controlling conduction through said sampling switch, gate control means connected to said gate and to the primary control circuit to control said sampling switch responsive to the status of said error signal, and a second inductive means magnetically coupled to said first inductive means and to said feedback inductor, said second inductive means and feedback inductor being connected to said first ground reference, and said second inductive means being connected to said gate control means.

5. The converter of claim 4 wherein,
said first inductive means, second inductive means and feedback inductor are all wound on a common core; said first and said feedback winding are wound with the same polarity and opposite to that of said feedback inductor.

6. The converter of claim 5 wherein,
said gate control means is a trigger pulse generator.

7. The converter of claim 5 wherein,
said first inductive means, second inductive means and feedback inductor are wound on a gapped core with said second inductive means being placed within said gap.

8. The converter of claim 7 wherein,
the turns ratio of said first inductive means, second inductive means and feedback inductor is one.

9. The converter of claim 8 wherein,
the polarity of said first inductive means and feedback inductor are the same and opposite respectively to the polarity of said second inductive means.

10. A direct current to direct current converter comprising, in combination:
a power transformer with a primary winding and a secondary winding, said primary winding having a first connection means for receiving a direct current supply source and a second connection means for connection to a first ground reference, and said secondary winding being connected to a second ground reference;
a switching means connected to said primary winding for controlling the duty cycle of power delivered to said primary winding from said source;
a first unidirectional control valve connected to a first end of said secondary winding and in series with a first inductive means for connection to an electrical load;
a second unidirectional control valve connected to a second end of said secondary winding and in series with said first inductive means;
a feedback signal generating means for generating a feedback signal representative of output voltage of the converter and including a second inductive means magnetically coupled to said first inductive means, said second inductive means being connected between said first ground reference and a third unidirectional control valve, and a voltage storage means connected between said third inductive means and said first ground reference whereby a feedback potential may be generated across said voltage storage means;
a differential amplifier means connected to said voltage storage means and to receive a select reference voltage for comparing a select reference voltage to a signal potential representative of said feedback potential;
a sampling driver means connected to receive a signal representative of the output of the differential amplifier means and for generating a delayed pulse signal representative of the output of the differential amplifier means with said pulse signal delayed a select time period dependent on a waveform of said feedback potential; and
a sampling switch means connected to the sampling driver means, the differential driver means and to said third unidirectional control valve, whereby said feedback signal representative of said feedback potential is controlled responsive to said delayed pulse signal.

11. The converter of claim 10 wherein,
said first inductive means and said second inductive means are windings on a common core in transformer relationship, the turns ratio of said first and second inductive means being one.

12. The converter of claim 11 wherein,
the first unidirectional control valve and said second unidirectional control valve are diodes of which the matching electrical characteristics are equal.

13. The converter of claim 12 wherein,
the polarity of said first and second inductive means are the opposite relative to each other.

14. The converter of claim 13 wherein,
the sampling switch means is in the form of a three terminal electronic switch having a gate connected to the sampling driver means for receiving said delayed pulse signal.

15. In an electronic transformer circuit wherein a primary winding of the circuit is connected to a first ground reference and a secondary winding is connected to a second ground reference and including a primary control circuit for controlling conduction of the primary winding, the improvement comprising:
a feedback network to sense an electrical load connected to said secondary winding, the feedback network including a first inductor connected in series with a first unidirectional conductive valve and a second unidirectional conductive valve, said first and second unidirectional conductive valves being connected to opposing ends of said secondary winding, a feedback inductor connected to said first ground reference and magnetically coupled to said first inductor and connected in series with a third unidirectional conductive valve, a sampling switch having one terminal connected with said third unidirectional conductive valve, said sampling switch including a gate for controlling conduction through said sampling switch of signals through said second unidirectional conductive valve and means connecting said sampling switch with said primary winding; and gate control means connected to said gate and to said primary control circuit to control conduction of said sampling switch as a function of the conduction of said primary winding.

16. An electronic transformer circuit of claim 15 wherein,
said first inductor and said feedback inductor are windings on a common core in transformer relationship, the turns ratio of said first inductor and said feedback inductor being one.

17. An electronic transformer circuit of claim 16 wherein,
said first and second unidirectional conductive valves are diodes of which the matching electrical characters are equal.

18. In an electronic transformer circuit wherein a primary winding of the circuit is connected to a first ground reference and a secondary winding is connected to a second ground reference and including a primary control circuit for controlling conduction of the primary winding, the improvement comprising:

a feedback network to sense an electrical load connected to said secondary winding, the feedback network including a first inductor connected in series with a first unidirectional conductive valve and a second unidirectional conductive valve, said first and second unidirectional conductive valves being diodes connected to opposing ends of said secondary winding and of which the matching electrical characteristics are equal, a feedback inductor connected to said first ground reference and magnetically coupled to said first inductor and connected in series with a third unidirectional conductive valve, said first inductor and said feedback inductor are windings on a common core in transformer relationship with the turns ratio of said first inductor and said feedback inductor being one, a sampling switch having one terminal connected with said third unidirectional conductive valve, said sampling switch including a gate for controlling conduction through said sampling switch of signals through said third unidirectional conductive valve and means connecting said sampling switch with said primary winding, gate control means connected to said gate and to said primary control circuit to control conduction of said sampling switch as a function of the conduction of said primary winding, a second inductor magnetically coupled to said first inductor and to said feedback inductor, said second and feedback inductors being connected to said first ground reference and said second inductor being connected to said gate control means.

* * * * *